Feb. 1, 1938.　　　G. M. BAYNE　　　2,106,824
ELECTRIC TOASTER
Filed Nov. 27, 1934　　2 Sheets-Sheet 1

WITNESSES:

INVENTOR
George M. Bayne.
BY
ATTORNEY

Feb. 1, 1938. G. M. BAYNE 2,106,824
ELECTRIC TOASTER
Filed Nov. 27, 1934 2 Sheets-Sheet 2

INVENTOR
George M. Bayne.
BY
ATTORNEY

WITNESSES:

Patented Feb. 1, 1938

2,106,824

UNITED STATES PATENT OFFICE 2,106,824

ELECTRIC TOASTER

George M. Bayne, Hamilton, Ontario, Canada, assignor to Westinghouse Electric & Manufacturing Company, East Pittsburgh, Pa., a corporation of Pennsylvania Application November 27, 1934, Serial No. 754,992

11 Claims. (Cl. 219—19)

My invention relates to electric cooking devices, and particularly to electric toasters of the domestic type.

An object of my invention is to provide a relatively simple and compact multi-slice toaster.

Another object of my invention is to provide a vertical toaster having a combined toaster-carrying and bread-slice-raising means.

Another object of my invention is to provide a toaster-carrying means that shall not become hot during use of the toaster.

Another object of my invention is to provide a novel heating-element spacing-and-supporting means in an electric toaster.

Other objects of my invention will either be apparent from a description of one form of device embodying my invention now preferred by me, or else appear from such description.

In practicing my invention, I provide a hollow sheet metal base having a dished crumb tray removably interfitting therewith, supporting means for the toaster being secured to the crumb tray. A pair of vertically-extending spaced end plates are located above the base, and a plurality of flat heating elements spaced apart from each other extend between the end plates. Skeleton racks for preventing slices or bread touching the heating elements are provided, one on the inside of each end or outside heating element, and one on each side of an intermediate heating element. The upper ends of the racks are bent toward the heating elements. Combined current-conducting and heating-element-supporting means are provided, and are effective to space the lower end portions of the heating elements apart the desired distance. The end plates are provided with vertically-extending openings therein and bread-slice-supports extending between the end plates and located between the heating elements are adapted to be moved vertically upwardly in the openings in the end plates by a combined bread-slice-support-actuating and toaster-carrying means, which means is pivotally connected by a linkage structure with the bread-slice-supports. A casing structure encloses the heating units, bread racks, end plates, the bread slice supports and the linkage, the top portion of the casing having depending flange portions overlapping the upper edges of the bread racks.

A vertical toaster designated generally by the numeral 11, includes an upwardly dished base 13, which may be made of sheet metal, the upper surface 15 of which has a somewhat smaller area than the lower portion thereof in order to provide a pleasing appearance. The hollow base 13 is provided with a pair of longitudinally extending openings 17 and 19 therein located intermediate the sides and the longitudinal center line thereof, and for a purpose to be hereinafter more fully described.

Figures 1, 2:
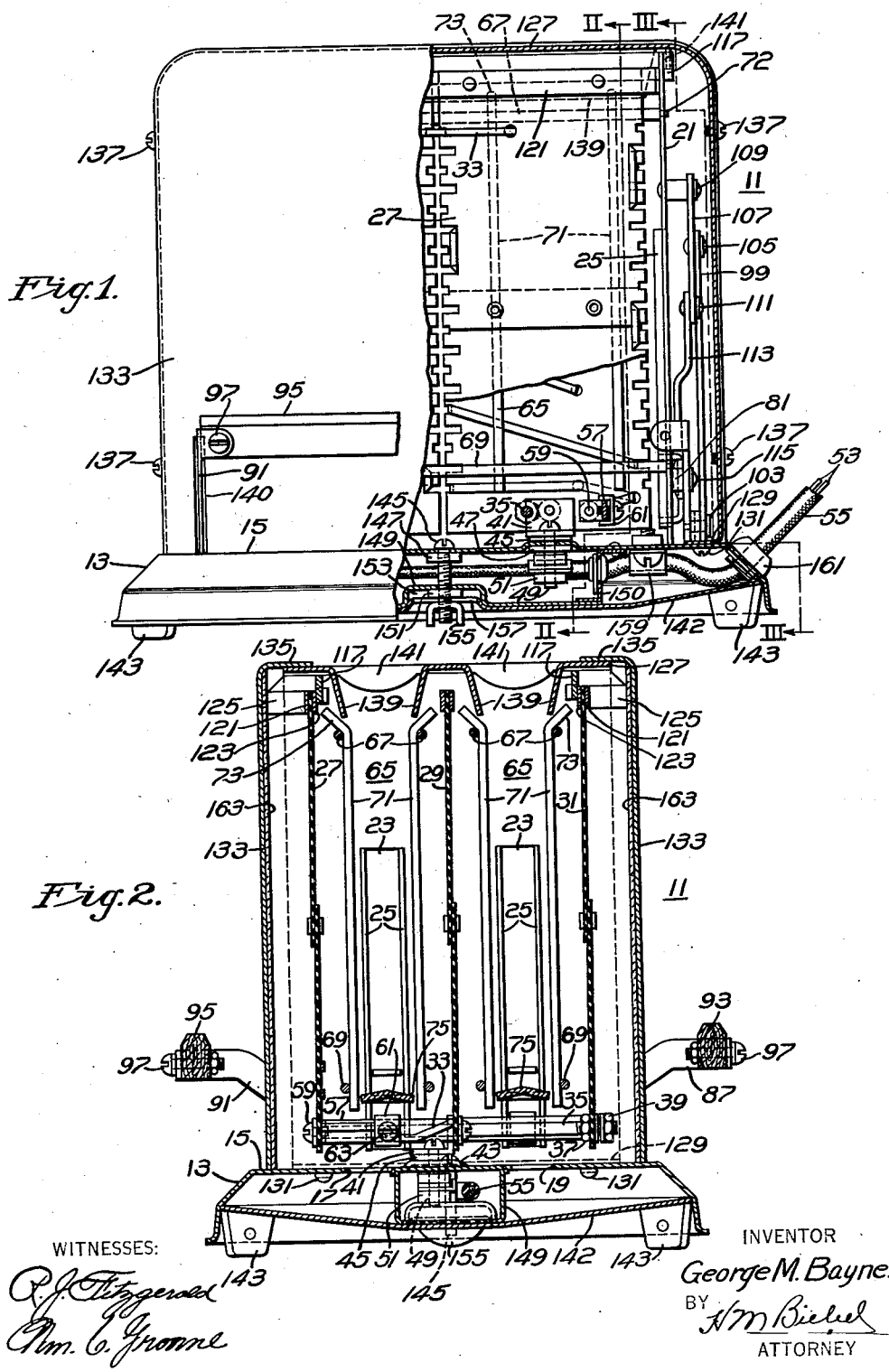
Figure 1 is a view partly in side elevation of a device embodying my invention with parts thereof broken away to show the internal construction thereof.
Fig. 2 is a view in vertical section therethrough taken on the line II—II of Fig. 1.

I provide a pair of vertically-extending end plates 21, only one of which is visible in Fig. 1 of the drawings, and it is to be understood that a similar end plate 21 is located adjacent to the left hand end of the base. Each end plate 21 is provided with a pair of spaced vertically-extending openings 23 therein, these being shown more particularly in Figs. 2, 3, and 4 of the drawings. It will be noted from Fig. 2 of the drawings that the edge portions of the end plates 21 at the openings 23 are bent inwardly to provide a relatively short flange 25 at each side of each opening 23 to constitute guide walls for a structure to be hereinafter described in detail.

A plurality of thin plates 27, 29, and 31 of electric-insulating material, preferably of mica, are supported above the base 13 by means to be hereinafter described, and while I may use a single sheet of mica extending from top to bottom, I have illustrated two such strips of mica each substantially one half of the total height, this being done in order to reduce the cost of the heating elements. Two such pairs of mica sheets are located side-by-side in each heating element. A resistor conductor designated generally by numeral 33, is operatively supported by the respective plates 27, 29, and 31 of electric-insulating material as by being wound in recesses or notches in the lateral edges of the respective plates. As will be apparent from Fig. 1 of the drawings, resistor-conductors 33 on plates 27 and 31 are located thereagainst on the inner surface only while this resistance conductor is located on both sides of plate 29 to thereby provide in effect two extended flat heating elements located in juxtaposition to each other so that where three heating units are provided, two slices of bread may be toasted at the same time without appreciable radiation of heat away from the outer surfaces of resistor-supporting plates 27 and 31.

Means for supporting the respective heating elements, including the plates 27, 29, and 31, include horizontally-extending metal rods 35, two such rods being provided which extend through the respective plates 27, 29, and 31 adjacent the lower edges thereof. As will be noticed particularly from Fig. 2 of the drawings, the outside plates 27 and 31 have nuts 37 and 39 screw-threaded thereon, one at each side of the respective plates of electric-insulating material in order to securely clamp the plates on and support them by the rods 35. A bracket 41, of a metal strip of substantially L-shape, has one of the rods 35 extending therethrough and soldered therein with its horizontally-extending portion insulatedly mounted on a small raised portion 43 of the top portion 15 of the base, a washer 45, of electric-insulating material, being provided to properly insulate this bracket from the base. Other washers 47, of electric-insulating material, are provided below the top portion 15, as is shown in Fig. 1 of the drawings, and a clamping bolt 49 extends through the assembly of washers and of electric-insulating material cooperating with a nut 51 thereon to hold the entire assembly in proper operative position on the base 15, and also to provide an electrical connection between the conductor 53 of a twin supply circuit cord 55 to the bolt 49 or a metal washer thereon all in a manner well known in the art. While Fig. 1 shows only one conductor of a twin conductor cord usually employed for such purposes, it is to be understood that the other conductor of the twin cord is connected to a similar terminal constituted by a second bracket 41 which operatively supports a second heating-element-support and current-conducting stud 35. It is to be understood that the resistor conductors 33 on the three plates 27, 29, and 31 of electric-insulating material are connected in series circuit relation with each other and the ends thereof are connected to the respective studs 35 by the nuts 37 and 39 in a manner well known in the art.

Means for electrically connecting the resistance conductor 33 on the intermediate plate 29 to that on the outer mica plates may be constituted by a short bar 57 whose end portions extend at substantially right angles to the main portion thereof, a short machine screw 59 extending through the cooperating plate of electric-insulating material and having screw-threaded engagement with the laterally-bent portion of bar 57 to properly hold the lower edge of the plate of electric-insulating material. Connection from the resistance conductor 33 may be made to bar 57 at substantially its mid portion thereof as by a clip 61 of substantially channel-shape in section bolted against the body or intermediate portion of member 57 by a short machine screw 63. It is to be understood that two such spacing-and-current-conducting members 57 are provided which are located at diagonally opposite corners of the assembly within the end plates 21.

Skeleton bread racks 65 are provided, one for each of the operative faces of the three heating elements, there being thus four such skeleton bread racks, each of which includes an upper horizontally-extending wire 67, a lower horizontally-extending wire 69 and a plurality of vertically-extending wires 71 which may be welded to the horizontal wires in a manner well known in the art. The end portions of the horizontal wires 67 and 69 are reduced, as is shown at 72 in Fig. 1 of the drawings in the upper right-hand corner thereof where they extend through the respective end plates 21 to be supported thereby. I wish to here point out that the upper end portions 73 of the spaced wires 71 are bent toward the associated and adjacent plates of electrical-insulating material for a purpose to be hereinafter set forth.

A pair of bread slice supports 75 is provided having their end portions extending through the openings 23 in the respective end plates 21, the upper surface of each of the supports being convex as will be noted more particularly from Fig. 2 of the drawings. This shape will prevent any crumbs falling thereon from remaining thereon during the operation of the device as will be hereinafter set forth. The end portions of the support 75 are in the form of a short bar 77 which extend respectively through the openings 23 to the outside of the end plates where they interfit with a cross bar 79, as is shown more particularly in Figs. 3 and 4 of the drawings. These cross bars, one adjacent each end plate 21, have bent-in end flanges 81 and upper and lower bent-in flange portions 83 and 85, which, as will be seen from Figs. 3 and 4 of the drawings, are spaced apart a sufficient distance in a vertical direction to act as guide members for the two bread slice supports 75 when they are moved upwardly and downwardly in the toaster. Small cotter pins 86 may extend through openings in the end portion 77 on the outside of the bar 79 to secure these parts in proper operative position relatively to each other.

A linkage structure effective particularly to cause raising of the bread slice supports and of any slices of bread that may be located thereon, includes a pair of bent lower arms 87, one at each end of the toaster and pivotally secured to the adjacent end plates at the right-hand edge portion thereof as by a pivot pin 89. A similar pair of bent lever arms 91 are provided at the opposite side of the toaster structure at the same end, each pair of bent lever arms 87 and 91 respectively, having their outer end portions secured to actuating-and-carrying bars 93 and 95, respectively. This may be done by means of small machine screws 97 extending through the arms or bars 93 and 95 of a non-heat conducting material, such as wood or possibly a phenolic condensation product.

It will be noted that the arms 87 and 91 at one end of the resistor structure have their inner ends overlapping a small distance, and a link 99 is pivotally secured to, say arm 87 at its inner end, the arm 91 being provided with an elongated slot 101 at its inner end, so that when an operator presses downwardly upon either one or both of the bars 93 and 95, the link 99 may be caused to move upwardly, a pivot pin 103 securing the lower end of link 99 to arm 87 and extending through the opening 101.

The upper end of link 99 is pivotally connected by a pin 105 to a second lever arm 107 intermediate its ends. One end of lever arm 107 is pivotally mounted on an end plate 21 by a pivot pin 109. The arm 107 normally extends downwardly, its lower end being pivotally connected by a pivot pin 111 to a depending second link 113, the lower end of link 113 being pivotally connected to the cross bar 79 at substantially its mid portion by a pivot pin 115.

It is to be understood that I provide two such linkage structures, one at each end of the toaster assembly so that a downward pressure on either or both bars 93 or 95 will cause the immediate and easy raising of the bread slice supports and of any slices of bread located thereon. This upward movement of the bread slice supports is sufficient to cause the upper portion of an ordinary slice of bread to be moved upwardly and outwardly of the structure as will be hereinafter more fully set forth.

Figure 5:

The upper end portions of end plates 21 are held in proper spaced relation relative to each other by a pair of spaced bars 117, which have interfitting engagement with the end plates 21, as by a tongue and groove connection. One portion of each of the bars 117 is initially bent outwardly from the general plane of the bar and is then forced into engagement with plate 21, as is shown more particularly in Fig. 5 of the drawings where this metal portion is designated by numeral 119. This provides a positive interlock between the spacing bars and the end plates and an appreciable force is required to cause disengagement of these cooperating members.

Means for insuring that the upper end portions of resistor supporting members 27 and 31 shall be held in proper operative and desired positions includes relatively thin metal strips 121 and 123, one on each side of the upper edge of the plates of electric-insulating material, and having laterally-bent end portions 125 which rest against the inside surface of end plates 21 adjacent their horizontal edges.

A casing assembly includes a strip or plate of metal 127 of substantially inverted U-shape constituting the top and end walls of the casing. Member 127 is provided with in-turned bottom flanges 129 as is shown more particularly in Fig. 1 of the drawings, which are clamped against the upper face 15 of the base by short machine screws 131.

The casing structure includes side plates 133, one at each side of the member 127, having inwardly turned flanges 135 overlapping the edge portions of member 127 at the ends and at the top thereof, a plurality of small machine screws 137 extending through the flanges and into member 127 to secure the two parts together. Reference to Fig. 2 of the drawings will illustrate a novel detail embodied in member 127, and particularly at the top portion thereof including particularly angularly downwardly bent flange portions 139, the lower ends of which overlap and cover the inclined portions 73 of the wires 71 of the bread racks. I provide further depending flange portions 139 adjacent to the ends of the openings 141 extending between the depending flanges 139 whereby the cover, and particularly the top portion of member 127 rests upon and interfits with the end plates 21 as will be noted more particularly by reference to the upper right-hand corner of Fig. 1 of the drawings. Each side plate 133 is provided with two spaced vertical slots 140 at its lower edge in which the lever arms 87 and 91 may be located and move up and down.

I provide further a crumb tray 142 which is slightly dished downwardly and is provided with depending heat-insulating supports 143, it preferably interfitting with the hollow or dished base 13 in substantially the manner shown in the right-hand end of Fig. 1 of the drawings. In order to hold the crumb tray removable in its proper operative position, the following structure is provided.

A machine screw 145 extends through the portion 15 of base 13 and a nut 147 is provided thereon to hold it on the top portion 15. A box-like member 149 is provided which cooperates with bracket 150 to provide a metallic cover for a part of the twin conductor cord within the hollow base 13 and encloses the connections of the conductor cord 55 and the terminal screws 49. The bracket 150 helps to support the cord 55 in the base 13. The box-like member 149 is held in its proper position by a nut 151 located thereagainst in a depression 153. A butterfly or wing nut 155 also engages screw 145 on the outside of crumb tray 142, the wing nut being of generally rectangular shape and entering an opening 157 in the crumb tray when in one position to permit removal of the crumb tray, but engaging the walls of the crumb tray adjacent the opening 157 when turned through substantially 90° to clamp the crumb tray in its proper operative position. A metal clip 159 secures the cord against the under surface of base 13 and a bushing 161 of electric-insulating materal prevents grounding of the cord on the base where the cord extends to the outside thereof, it being understood that any desired length of such cord may be provided in a manner well known in the art.

Figure 3:
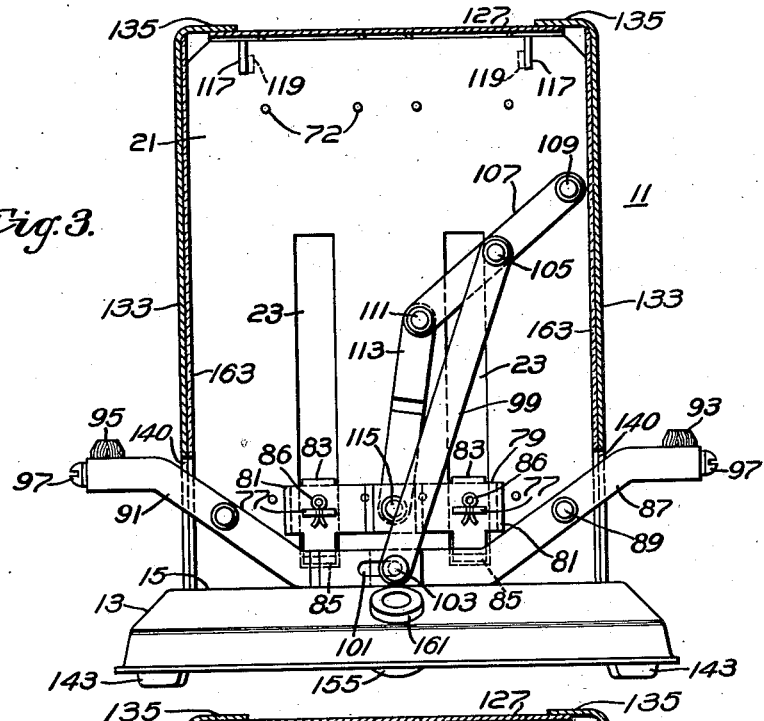
Fig. 3 is a view in vertical section therethrough taken on the line III—III of Fig. 1.
Figure 4:
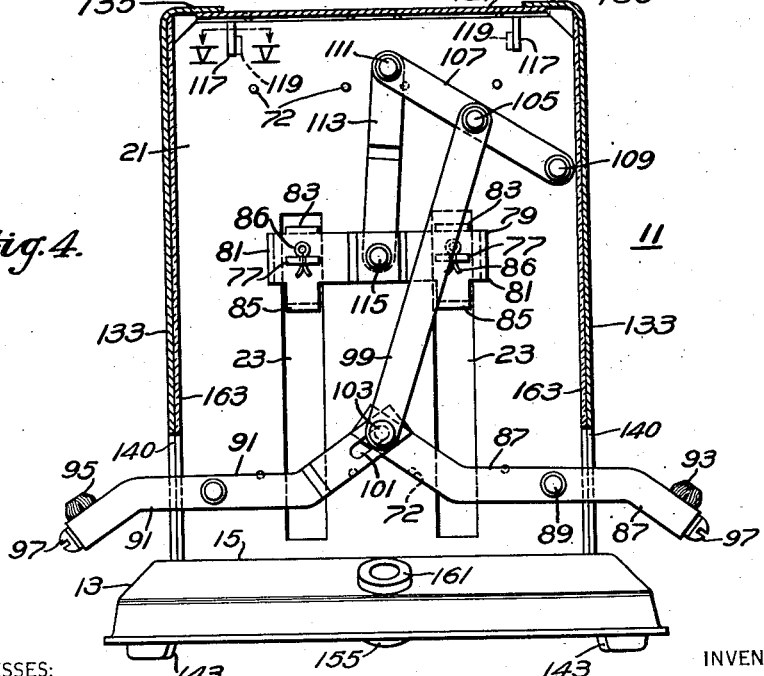
Fig. 4 is a view in section similar to that of Fig. 3 but showing a different position of the bread slice raising means, and, Fig. 5 is a fragmentary view in horizontal section taken on the line V—V of Fig. 4.

It will be obvious that the normal position of the movable parts of the toaster are those shown more particularly in Figs. 2 and 3 of the drawings where the bread slice supports are located at the lower end of their travel. An operator can drop a slice of bread through the respective openings 141 without danger of jamming or catching of the slices of bread, since the flange portions 139 overlap the wires 71 of the racks and effectively prevent such action. If it be assumed that the resistor conductor 33 has been energized long enough so that the toaster assembly is relatively warm or even hot, both sides of each slice of bread will be toasted simultaneously and if the operator desires to ascertain the progress of the toasting action, he need only press downwardly on either one of the bars 93 or 95 to raise the bread slice supports, with the result that the upper end of the bread slices will be raised above the top portion of the casing so the visual inspection of the degree of toasting thus far effected is easily made. When the slices of bread have been toasted to the desired degree, pressure on the bar 93 or 95 or on both of them will raise the toast as hereinbefore described, so that they may easily be grasped and removed therefrom.

Any crumbs brushed or falling from the slices of bread during handling and which fall upon the convex surface of the support 75 will roll off of such surface and drop downwardly through one of the openings 17 or 19 in the base and onto the crumb tray 142. This crumb tray is easily and quickly removed from time to time by turning wing nut 155 through substantially 90°, so that the greater length of nut 155 will correspond to the greater length of opening 157, thereby permitting easy removal of crumb tray 142. The crumb tray can be easily and quickly replaced in its proper operative position.

As it is desired to conserve as much heat as possible for the toasting operation I may provide the side plates 133 with a layer 163 of sheet asbestos, secured against the inner surface thereof, to reduce the amount of heat radiated away from the resistor supporting plates 27 and 31.

While I have illustrated and described an embodiment of my invention now preferred by me, I do not desire to be limited thereto, since changes may be made therein within the scope of the appended claims which are to be limited only by the prior art.

I claim as my invention:

1. In a toaster, the combination with a base, spaced end plates thereon, bread slice supports vertically movable in the end plates, a linkage pivotally mounted on the end plates and connected to the bread slice supports and a side bar operatively connected to the linkage and constituting with the linkage a carrying means for the toaster and effective to raise toasted slices of bread resting on the supports partly above the end plates.

2. A toaster including in combination, a base, spaced end plates thereon having vertical openings therein, bread slice supports extending through the openings in the end plates and vertically movable therein, a movement-multiplying linkage mounted on the end plates and pivotally connected to the end plates and the bread slice supports and manually actuable means operatively connected to the linkage to operate the same and including two bars effective to permit carrying the toaster by an operator.

3. A toaster including in combination, a base, parallel-spaced flat heating elements thereon, spaced end plates at the respective ends of the heating elements having spaced vertical openings therein, bread slice supports located between the heating elements and extending outwardly beyond the end plates through the openings therein, cross bars interlocked with the ends of the bread slice supports and a manually-actuable linkage pivotally connected to the cross bars to cause upward movement of the bread slice supports.

4. A toaster comprising in combination, a base, spaced end plates extending above the base, three spaced plates of electric-insulating material above the base and between the end plates, resistor conductors on the respective electric-insulating plates, a pair of current-conducting rods supporting the electric-insulating plates at their lower ends and also spacing them apart and other current-conducting and spacing members extending between adjacent electric-insulating plates and having end portions secured thereto.

5. A toaster comprising in combination, a base, vertically-extending spaced end plates on the base and having a pair of vertical openings in each plate, a plurality of flat, spaced-apart electric heating elements extending vertically between the end plates and at substantially right angles thereto, bread slice supports between the heating elements and extending beyond the end plates through the openings therein, lever arms having their outer ends connected by a bar and pivotally mounted intermediate their ends on the respective end plates, links adjacent each end plate having their respective lower ends pivotally connected to the inner ends of the lever arms and their upper ends pivotally secured to lever arms intermediate the ends thereof, means pivotally mounting one end of each of the second named lever arms on the respective end plates and second link members pivotally connected to the other ends of the second named lever arms and to the bread slice supports.

6. A toaster comprising in combination, a base, spaced end plates on the base extending vertically upwardly therefrom, spaced-apart flat heating elements between the end plates supported from the base, skeleton bread racks between adjacent heating elements and supported by the end plates and a cover member for the toaster having a top portion with openings therein and depending flanges at the sides of the openings overhanging the upper ends of the bread racks to readily guide thereinto the bread to be toasted, said top portion of the cover member interfitting with the upper edges of the end plates.

7. A toaster comprising in combination, a base, a pair of vertically extending end plates on the base, a spacing bar between the end plates and interfitting therewith at the upper edges of the plates, a flat heating-resistor-supporting member having a resilient metal bar secured thereto at its upper end, the end portions of which are bent at substantially right angles to the resistor supporting member and are located against the end plates, and a side plate adapted to have its inner surface engage the ends of the bent portions of the metal bar and press the bar against the spacing bar.

8. A toaster including in combination, a dished base having an elongated opening in its top portion, flat heating elements extending upwardly from the base one at each side of the opening, a bread slice support between the heating elements, a crumb tray, fitting within the dished base and having heat-insulating toaster supports secured thereto and means for releasably securing the crumb tray within the dished base.

9. A toaster comprising in combination, a base, a pair of spaced end plates on the base, a plurality of vertical flat heating elements above the base between the end plates, a bread slice support between the heating elements extending through, guided by and vertically movable in the end plates, a casing structure on the base having a bread-slice-insertion opening in its top above the bread slice support, and means operatively secured to the end plates and to the bread slice support and having a portion extending outwardly through the casing structure to raise the bread-slice-support and to carry the toaster.

10. A toaster comprising in combination, a base, a pair of spaced end plates on the base, a plurality of vertical flat heating elements above the base between the end plates, a bread slice support between the heating elements extending through, guided by and vertically movable in, the end plates, a casing structure on the base having a bread-slice-insertion opening in its top above the bread slice support and means operatively secured to the end plates and to the bread slice support and having a portion extending outwardly through the casing structure to raise the bread-slice-support by downward pressure on the part outside of the casing, said part including two bars of non-heat conducting material, one at each side of the toaster to permit of carrying the toaster by an operator.

11. A toaster including, in combination, a dished base having an opening in its top portion, a heating element extending upwardly at one side of the opening, a bread slice support near the bottom of the heating element, a crumb tray fitting within the dished base and having an aperture therein longer in one direction than another, and means including a clamping member having one dimension longer than another, both of said dimensions being less than the corresponding longer and shorter dimension of said aperture, for readily manually clamping said tray within said base by disposing said clamping member outside said aperture with its longer dimension transverse to the longer dimension of said aperture and for unclamping the tray to permit removal thereof by turning said clamping member to permit said aperture to pass thereover.

GEORGE M. BAYNE.